May 20, 1969          D. C. SITEMAN          3,445,559
METHOD OF MAKING A SELF-LOCKING STRUCTURE
Original Filed April 28, 1965
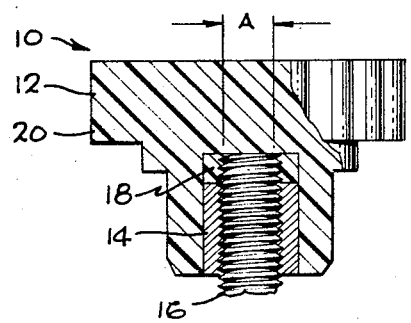
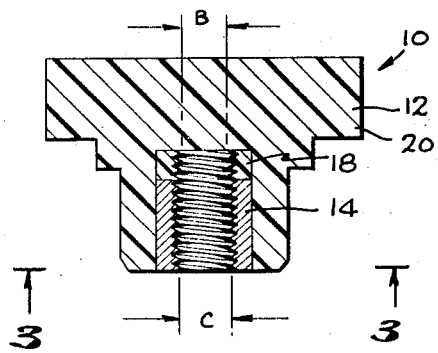
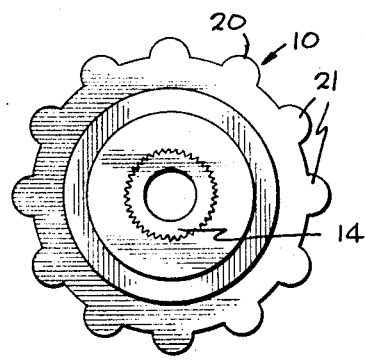
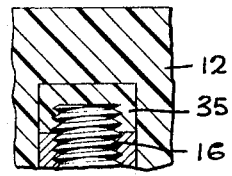
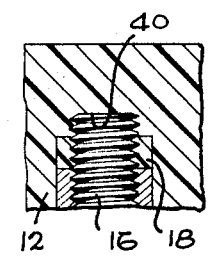
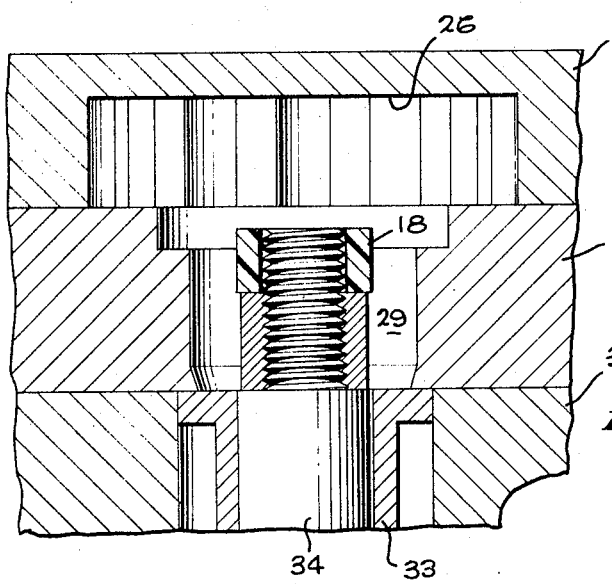
DAVID C. SITEMAN
INVENTOR
BY Warren T. Jessup
ATTORNEY 3,445,559
METHOD OF MAKING A SELF-LOCKING
STRUCTURE
David C. Siteman, Los Angeles, Calif., assignor to Olympic Plastics Company, Inc., Los Angeles, Calif., a corporation of California
Original application Apr. 28, 1965, Ser. No. 451,604, Divided and this application Feb. 27, 1967, Ser. No. 641,073
Int. Cl. B29d 3/00
U.S. Cl. 264—263     5 Claims

ABSTRACT OF THE DISCLOSURE

A locknut of non-resilient material molded under high pressure by placing a metal, internally threaded sheath, and a collar of somewhat dilatant abrasive resistant material on a stud projecting into a mold cavity. The sheath provides holding threads. The collar contracts under molding pressure to provide a seal around the stud during molding, and acts as a lock material to grip a stud when the locknut is installed in service.

---

This is a division of application Ser. No. 451,604, filed Apr. 28, 1965, now abandoned.

This invention relates in general to the art of threaded devices which have a removable grip, and more specifically to locknut structures having deformable inserts to resist disengagement from an engaged thread and being operative to permit repeated re-engagement and to resist disengagement.

This present invention operates on the basic principle of plastic deformation in order to cause a locking interaction between a nut and bolt. Other arrangements have been provided in the form of inserts through the wall of a nut. For example, there is one such locknut which employs a cylindrical plug inserted through the side wall of the nut, and another that uses a longitudinal dike in a slot provided in the wall of the nut.

Separate manufacturing operations to provide deformable retaining inserts are expensive. Furthermore, the gripping action of such inserts must be considerable for the limited surface contact available, and, therefore, the material is required to meet exacting specifications.

It is an object of this invention to provide an improved new process for molding highly-abrasive moldable compounds around a threaded insert and dilatant shroud.

More specifically, it is intended by this invention to provide a self-locking structure wherein the dilatant material forming the locking action is a full continuation of the strength-producing threaded structure, whereby the thread of a complementary device is gripped around its entire circumference rather than merely at a localized point.

Yet another object of this invention is to provide an improved method of molding. In some specifications for electrical work, a high-dielectric strength is required, and one of the castable resin compounds developed to meet military specifications for such purposes is both very fluid and very abrasive under the high pressure and temperature conditions necessary for molding the compound.

To produce a molded dielectric body of such material with a threaded sheath insert, a mold cavity is produced by assembly of mold pieces having suitable cavity sections therein. Then, a core is provided having a threaded surface complementary to the threaded insert to be placed in the molded resin body. Thus, by placing the insert upon the stud, the stud may be held centered within the mold cavity to hold the insert in position during the molding operation, whereafter the core is threaded out of the finished product and the insert remains.

Heretofore, it has been a problem to keep highly-fluid resin materials out of the junction between the insert teeth and the core. If the core does not fit the insert sheath in a very close relationship, the injected material may cause serious locking, and even prevent removal of the core. Hence, it is desired to shut off the interface between core and insert during the molding period, and such is another object of this invention.

Also, it has been found that extension of the core beyond the end of the insert sheath, where it is in contact with the molded material of the body, will cause the core to wear away rapidly as the core is threaded out of the finished product. Such wear has been sufficiently severe in past operations that the cores of necessity are made removable and are discarded after a short production run, even though hardened alloy steel is employed.

Accordingly, it is a further object of this invention to protect the end of the threaded core from abrasive action of the material being molded.

In accordance with these and other objects which will become apparent hereinafter, a preferred form of the present invention is disclosed in the accompanying drawings wherein:

FIGURE 1 is a section through a locknut and engaged stud, illustrating the physical relationship and operation of the parts of the invention;

FIGURE 2 is a similar section without the engaged stud;

FIGURE 3 is an end view taken along line 3—3 of FIGURE 2;

FIGURE 4 is a section through an alternative embodiment of dilatant shroud lock material;

FIGURE 5 is an alternative embodiment employing the body of material as additional lock structure; and FIGURE 6 is a section through a composite mold providing a molding cavity, and illustrating the positioning of sheath insert and dilatant shroud prior to molding.

The invention is embodied as a self-locking structure whether or not it is in the form of the locknut illustrated in the drawings. However, the preferred, and currently most often used embodiment, is set forth in the drawing as an illustration of inventive concept.

The drawing illustrates a locknut 10 intended primarily for electrical purposes. Therefore, it is composed of a high-dielectric body 12 carrying a corrosion-resistant steel sheath insert 14. This sheath is a threaded means, in the broad concept, but is illustrated in this embodiment as a tubular member carrying internal threads. Sheath 14 is serrated on the exterior surface, as best seen in FIGURE 3, in order to provide a rotative interlocking fit with the body 12.

In FIGURE 1, a stud 16, having external threads to fit the threaded means 14, is illustrated in the operative position to show the structure in use. The sheath 14 has a lead end which forms the opening into the locknut 10 and a terminal end interiorly of the body 12. The stud 16, in FIGURE 1, extends beyond the terminal end of the sheath 14.

A shroud 18 of dilatant material forms a general extension of the sheath 14. Shroud 18 encompasses the end of stud 16 beyond the terminal of the sheath 14 and has for one purpose, the engagement of the stud 16 in a grip which resists rotative movement of the nut and stud.

A dilatant plastic material of a type highly resistant to cutting and abrasion is selected for the shroud 18. The material may not be easily cut and abraded by the threads of stud 16, or it will not serve the purpose of repeatedly engaging the stud and resisting relative rotation. This characteristic is required for a good locknut. Such qualities make re-use of the locknut possible. Otherwise, if the material were quickly abraded, the nut would have to be discarded after one or two times of use.

Probably the most useful material for serving the purpose of gripping shroud 18 will be the class known as fluorocarbons, one of the best known of which is sold under the trade name Teflon.

The shroud 18 may be provided as a straight-wall tube, having an internal diameter less than the diameter of the stud 16, or may be cast. Some designs have rudimentary threads of small diameter or imperfect formation. The function, in any of these selections, is to require the external thread of stud 16 to force into the body of the material of the shroud 18 and cause the material to compress within the space permitted for the threads in the body 12. By its nature, the dilatant material will tend to force itself tightly against the stud and thus cause a gripping action. Therefore, resistance to removal is obtained by such gripping action and will not come loose from the stud by ordinary vibration, but force will overcome the grip and separate the shroud from the stud.

In order to assist in the facile installation and removal of the knob 10 from the stud 16, the body 12 is formed with an enlarged knob head 20, having a peripheral finger grip flange formation. The individual flanges are indicated in the drawing by the reference character 21.

The invention is also embodied in the process of making the locknut. In FIGURE 6, the die 25, having a cavity 26 formed to the dimensions of the knob head 20, provides one section of the complete mold.

Die 28, having a cavity 29 therein, is provided to form the stem portion of the body 12.

A base plate 31 provides a holder for a core carrier 33. A core 34, of hardened steel, is removably carried by carrier 33, and is a stud of the dimensions of stud 16.

In operation, the dies 25 and 28 are assembled to form the outlined form of the body 12. The bottom end of the stem portion is closed off by the carrier 33. Thus, the core 34 is positioned on the axis of the locknut to be formed. The sheath 14 is threaded down upon the stud end of core 34 and the lead end thereof is thus placed on a plane with the end of carriage 33. Hence it will be flush with the end of the finished body 12. The sheath 14 is shorter than the stud end of core 34, and, therefore, the stud extends beyond the sheath.

A dilatant shroud 18 is placed over the exposed threads, as shown in FIGURE 6. In this illustration, the diameter of shroud 18 is exaggerated to emphasize the nature and function of the shroud.

The material that is employed for the molding of body 12 is selected from one of a number of suitable dielectric materials. The material currently specified in the United States military specifications is very fluid under molding pressures and temperatures, and is filled with chopped glass particles. It is quite abrasive and is molded under considerable pressure and temperature.

Accordingly, were this material to be injected under high pressure against the core 34, it would cause abrasion and would wear away the core even during the molding process. Furthermore, after solidifying, were the core 34 embedded into this material, the very removing action of the core would cause excessive wear.

Furthermore, because of the high fluidity of the material under temperature and pressure conditions, it tends to follow the interface between the threaded surfaces of core 34 and sheath 14, and to lock these materials against separation.

The shroud 18 is effective to serve as a sealing gasket to prevent this intrusion between the threaded surfaces. It also protects against the abrasion of the threaded surfaces during molding, and is non-abrasive to the core during removal of the core.

Under the temperature and pressure conditions specified, the shroud 18 will be compressed as the dielectric material is injected, and, therefore, it will be reduced in diameter and forced to conform to the threaded shape of the stud 16. Thus, to illustrate this fact, the shroud 18 is illustrated in FIGURE 6 as being of larger diameter than the diameter of the exterior of sheath 14. Then, it will be seen that in FIGURE 1 the diameters are equal, thus indicating that the shroud has been compressed to a smaller diameter than its natural diameter. This same compression would take place if the shroud 18 were made equal to the diameter of the sheath 14 in its relaxed condition, or even if smaller. Thus, the illustration is arbitrary.

Furthermore, the illustration chosen in FIGURE 6 is of a tubular shroud 18 having no internal threads. Thus, as the pressure acts upon the shroud, it is formed into conformity with the stud 16, although it resists such conformity.

Therefore, in FIGURE 2, it will be seen that the shroud 18 has teeth formations which have been created by such conformity to the core 34, and by action of the installation of stud 16 one or more times. However, dimension B illustrates the fact that the dimension of the resultant threaded opening in the shroud 18 is less than the dimension C of the sheath 14. Note that dimension A in FIGURE 1 is equal to dimension C. This change in dimension illustrates the fact that the shroud 18 is dilatant and acts repeatedly to grasp the end of stud 16.

Therefore, it is seen that the shroud 18 provides a threefold function: (1) It is positioned to block off the extension of the threads of the sheath 14, and thus act as an ever-ready grip device. (2) It serves to prevent unintentional locking of the threads during molding. (3) It prevents excessive wear of molding equipment.

To further assure a complete protection of the end of core 34, and to provide a snubber against which the stud 16 may abut, an alternative embodiment illustrated in FIGURE 4 employs a shroud 35 in the form of a full-covering cap. The operation and result is substantially identical with that of the shroud 18, and further provides the indicated overall protection and snubber action. Furthermore, in making such cap, it is possible to provide rudimentary threads and thus enable a stiffer material to provide the gripping action.

It is useful, in some instances, to provide a deliberate extension of the core 34 through the shroud 18 and into the molded body 12. In FIGURE 5, a bore 40 is shown in the body, as having been formed by an elongated stud of the nature of core 34. Thus, although the end of such core will quickly wear away and form a tapered bore 40, such tapered bore will provide a direct mechanical interlock by wedge action which is desirable in some circumstances.

What is claimed is:

1. The process for making a locknut, comprising the steps of:

providing a threaded stud core;
encasing said core over a part of its length in a threaded sheath with the end of the core exposed;
encasing said end in a dilatant shroud;
said stud core and sheath being substantially incompressable under injection mold pressure, and said shroud being compressable to a large comparative extent; and having a body characterized by ability to yield under expansion pressure of a stud forced therein, and to return to an obstruction condition upon removal of such internal force;
thereafter, molding a body of material around said composite of stud, sheath and shroud under conditions causing said shroud to compress onto said core and take on at least some of the thread formation of said core and to seal the space between the threads of the sheath and core; and
finally, removing said threaded core.

2. The process for making a locknut, comprising the steps of:

providing a mold having a cavity shaped to produce the external form of a holding body having drivereceiving surfaces, said cavity having an open end;
providing a core base having a mold closing end;
providing a threaded core extending from said mold closing end;
providing a threaded sheath over said threaded core and positioned against said mold closing end, said sheath being shorter than said threaded core;
providing a dilatant shroud over the core projecting beyond said sheath;
placing said core base against said mold with the closing end thereof closing said mold cavity and the core with the sheath and shroud projecting into the mold cavity;
injecting a moldable material into said cavity under pressure to press said shroud into and around the threads of the core to seal the core against said moldable material entering between sheath and core during the molding step; and
thereafter removing said material from the mold as a unitary locknut structure with said sheath and shroud molded therein, and rotating said core base about the axis of said threaded core to threadably extract said core from said moldable material.

3. The process of making a locknut, as defined in claim 1, wherein the shroud is an annular band and the core end surface is exposed to the molded material.

4. The process of making a locknut, as defined in claim 1, wherein the shroud is a full covering cap over the core end.

5. The process of making a locknut, as defined in claim 1, wherein the shroud is an annular band encircling less than the entire end of the core, whereby a portion of the core is encased in the molded material to form a lock action.

References Cited

UNITED STATES PATENTS

| | | | |
|---|---|---|---|
| 1,355,254 | 9/1920 | Parsons | 264—278 X |
| 3,125,801 | 3/1964 | Fields | 29—421 |

ROBERT F. WHITE, *Primary Examiner.*

A. M. SOKOL, *Assistant Examiner.*

U.S. Cl. X.R.

18—36; 151—7; 264—266, 278